United States Patent [19]

Zubov et al.

[11] Patent Number: 5,046,902

[45] Date of Patent: Sep. 10, 1991

[54] SPIRAL DRILL

[76] Inventors: Alexei V. Zubov, ulitsa Shelkovichnaya, 49/63, kv. 96; Vladimir A. Zubkov, ultisa Perovomaisakaya, 37/45, kv. 25; Anatoly E. Volkov, ulitsa Shelkovichnaya, 212, kv. 51; Vladimir P. Katusov, ulitsa Shelkovichnaya, 204, kv. 55, all of Saratov, U.S.S.R.

[21] Appl. No.: 499,269

[22] PCT Filed: Oct. 21, 1988

[86] PCT No.: PCT/SU88/00204

§ 371 Date: Jun. 12, 1990

§ 102(e) Date: Jun. 12, 1990

[87] PCT Pub. No.: WO90/04473

PCT Pub. Date: May 3, 1990

[51] Int. Cl.$^5$ ............................................. B23B 51/02
[52] U.S. Cl. .................................................. 408/230
[58] Field of Search ............................. 408/227, 230

[56] References Cited

U.S. PATENT DOCUMENTS

| 61,208 | 1/1867 | Kasson | 408/230 |
| 1,762,736 | 6/1930 | Peakes | 408/230 |
| 4,744,705 | 5/1988 | Imanaga | 408/230 |

FOREIGN PATENT DOCUMENTS

| 2144217 | 3/1973 | Fed. Rep. of Germany. | |
| 2521938 | 11/1975 | Fed. Rep. of Germany. | |
| 3545586 | 7/1987 | Fed. Rep. of Germany. | |
| 2583667 | 12/1986 | France | 408/230 |
| 318208 | 12/1988 | Japan | 408/230 |
| 84-910 | 3/1984 | PCT Int'l Appl. | 408/230 |
| 629987 | 5/1982 | Switzerland. | |
| 191313 | 3/1967 | U.S.S.R. . | |
| 521074 | 7/1976 | U.S.S.R. . | |
| 622588 | 9/1978 | U.S.S.R. | 408/230 |
| 1419624 | 12/1975 | United Kingdom | 408/230 |

Primary Examiner—Daniel W. Howell
Attorney, Agent, or Firm—Fleit, Jacobson, Cohn, Price, Holman & Stern

[57] ABSTRACT

The invention relates to the cutting tools for machining of holes.

The claimed drill has helical chip flutes wherein the leading (5) and flank (8) surfaces and their mating surface (10) represent, each, a part of the circular helical surface.

6 Claims, 1 Drawing Sheet

SPIRAL DRILL

TECHNICAL FIELD

The present invention relates to cutting tools for machining holes and, more particularly, to spiral drills.

BACKGROUND OF THE INVENTION

Known in the prior art is a spiral drill comprising chip flutes set at an acute angle to the drill axis and having, each, a leading surface which, on intersecting the rear drill sharpening surface, forms the major cutting edge, a flank surface merging into the land, and a mating surface of the leading and flank surfaces, contacting the drill core (DA, B, 2144217).

This drill has a large body of tool material, limited by the internal surfaces of helical chip flutes and lands and, by virtue of this fact, the chip flutes have a limited small volume included between the external surfaces of helical chip flutes and the surface of the hole walls. Due to such an arrangement the process of drilling holes in parts of low-strength materials, e.g. foil-coated dielectric (glass-base textilite, paper-based laminate, etc.), plastics, plexiglas, ligth alloys, etc. producing an abundance of chips fails to ensure sufficient disposal of chips.

While handling such materials, the chips stick and clog the chip flutes making it necessary to stop work, clean out of replace the drill; besides, in case of small-diameter holes, particularly smaller 3 mm, the drills may even break. All this, taken together, reduces the drilling efficiency.

The lands of such a drill protrude above the flank surface of helical chip flutes and have a considerable width. This increases friction and heating of both the drill proper and the walls of the hole in the course of drilling. Heating of the drill brings about a sharp deterioration of its strength particularly when drilling holes in the parts made of glass-base textolite, paper-based laminate, plastics and other materials with a low heat conductivity.

The leading surface of the helical flutes in such a drill forms, together with the surface of lands, an angle approaching 90° which hinders the cutting process considerably.

Thus, heating of the hole walls and difficult cutting result in a considerable roughness and poor quality of holes machined in the parts of viscous, low-strength materials, particularly in printed circuit boards made of foil-coated dielectrics containing solidified epoxy resins having a tendency towards burns, melting and spreading over the hole walls. By virtue of the above reasons, the drilled printed circuit boards have such characteristic defects as burrs or exfoliation of foil on the hole edges, tousling of glass fibres or their tear-out from the hole surface. These defects cannot always be corrected by additional machining and reduce the quality of subsequent metallization of holes, particularly in printed circuit boards.

Besides, manufacture of such a drill involves certain technological complications due to the fact that the helical chip flutes have a complex curvilinear shape with a charp elevation at the point where the flank surface of helical flutes merges into a land. This complicates the shape of the disc tool for machining helical flutes.

SUMMARY OF THE INVENTION

The main object of the present invention is to provide a spiral drill in which the design of the leading and flank surfaces of helical flutes would ensure high productivity, stability of drills and high quality of drilled holes in parts of low-strength materials: foil-coated dielectrics (glass-base textolite, paper-based laminate, etc.), plastics, plexiglas, light alloys and the like and would improve the technology of drill manufacture.

This object is attained in the drill with helical chip flutes inclined at an acute angle to the drill axis, said flutes having, each, a leading surface which, on crossing the rear drill sharpening surface, forms the major cutting edge, a flank curface merging with the land and a mating surface of the leading and flank surfaces contacting the drill core wherein, according to the invention, the leading and flank surfaces of helical flutes and their mating surface constitute, each, a part of the circular helical surface.

This design of the drill ensures a smooth rounded shape of each portion of helical flutes and a larger chip space confined between the outer surface of helical flutes and the surface of hole walls.

Besides, the surface curvature of the helical flutes in any portion of their surface is insignificant while the flank surface of helical flutes has no undercutting. These design features rule out sticking and clogging of helical flutes with chips in operation, exclude the time for their cleaning, ensure reliable disposal of chips while raising the feed and cutting speed. All the above factors step up the efficiency of hole-drilling.

Improvement of chip disposal and reduction of land width is achieved to making the helical flutes in the form of three conjugated circular helical surfaces without sharp elevation of the lands above the flank surface of helical flutes. This also reduces friction and temperature in the course of hole drilling and, consequently, improves durability of the drill.

Easy and fast removal of chips reduces their pressure on the hole walls and diminishes their damage, particularly, in parts of low-strength materials. Besides, the drill lands do not stand out above the flank surface of helical flutes which improves abstraction of heat during hole drilling into the drill body and reduces heating of the hole walls.

The above-described advantages improve the standard of machining of holes in parts of low-strength materials, particularly in printed circuit boards of foil-coated dielectrics containing solidified epoxy resins with a low softening temperature.

The helical flutes of the drill have a smooth rounded shape without steep elevation at the point where the flank surface of flute grooves merges with the land which enables the helical flutes to be machined during drill manufacture with a single disc tool of a simple geometric profile in axial section which improves the technology of drill manufacture.

It is practicable that the leading surface of helical flutes in the section perpendicular to the drill axis should follow the arc of a circle with a radius $r_1$ varying from about 0.30 to about 0.35 of drill diameter D. When sharpening the cutting portion of the drill this ensures a rational shape of the major cutting edge which is formed by intersection of the leading surface of helical flutes with the sharpening surface of the drill.

If the radius $r_1$ is considerably smaller than 0.3 D this results in spalling or crushing of corners of the major cutting edge near the drill land. Conversely, making the radius $r_1$ considerably larger than 0.35 D impairs the quality, increases roughness of the drilled hole, and creates burrs owing to worsening of cutting by the major cutting edges near the drill lands.

It is practicable, that the tangent to the arc of a circle with a radius $r_1$ at the point farthest from the drill axis should form an angle $\gamma$ from about 25° to about 30° with the straight line drawn through the drill axis to the same point which will facilitate considerably the process of cutting with the minor cutting edge of the drill land and improve the quality of hole machining.

The angle $\gamma$ considerably smaller than 25° impairs cutting with the minor cutting edge of the land and worsens the standard of hole machining. The angle $\gamma$ considerably larger than 30° results in spalling or crushing of the major cutting edges of the drill.

It is practicable that the flank surface of the helical flutes in the section perpendicular to the drill axis should be made along the arc of a circle with a radius $r_2$ varying from about 0.25 to about 0.30 of drill diameter D.

This ensures the requisite strength of drills and enables the flank surface of the helical drill flutes to be machined with the rectilinear portion of the disc tool profile which improves the technology of drill manufacture.

The radius $r_2$ considerably smaller than 0.25 D hampers the machining of helical flutes and interferes with the process of chip disposal. The radius $r_2$ considerably larger than 0.30 D reduces the strength of drills and efficiency of hole machining by decreasing the feed.

It is practicable that the tangent to the arc of a circle with radius $r_2$ at the point farthest from the drill axis should form an angle $\alpha$ with the perpendicular to the straight line drawn through the drill axis to the same point varying from about 8° to about 12° which will improve abstraction of heat and reduce the temperature of the land thus raising the durability of the drill. In this case the land is narrow which allows raising the standard of hole machining while retaining the land strength.

The angle $\alpha$ considerably smaller than 8° impairs the standard of hole machining and reduces the durability of the drill due to rubbing of a portion of the flank surface of helical flutes against the hole walls, while the angle $\alpha$ considerably larger than 12° worsens the strength of the land and back of the drill, causes spalling or crushing of lands and breaking of the drill.

The mating surface of the leading and flank surfaces of helical flutes in the section perpendicular to the drill axis should better be made along the arc of a circle with a radius $r_3$ ranging from about 1.0 to about 1.5 drill diameters.

The value of radius $r_3$ considerably smaller than 1.0 D results in frequent clogging of helical flutes with chips, increase of temperature and, consequently, worsening of quality and reduction of efficiency of hole drilling as well as in shortening of drill life. The value of radius $r_3$ considerably larger than 1.5 D results in reduced strength of the drill point, breakage of the drill or a lower efficiency of hole drilling due to a reduced feed.

It is practicable that the mating surfaces of the leading and flank surface of helical flutes form the drill core K located between them with a thickness from about 0.2 to 0.3 drill diameter.

The thickness of the core K considerably smaller than 0.2 D reduces the longitudinal stability of the drill and the precision of hole machining. The thickness of the core K considerably larger than 0.3 D brings about a reduction of the chip space, worsens the removal of chips from the cutting zone, results in damaging the hole surfaces with chips, decreases efficiency, standard of hole machining and durability of drills.

BRIEF DESCRIPTION OF THE DRAWINGS

Now the invention will be described by way of example with reference to the accompanying drawings in which.

BEST MODE FOR CARRYING OUT THE INVENTION

Figure 1:
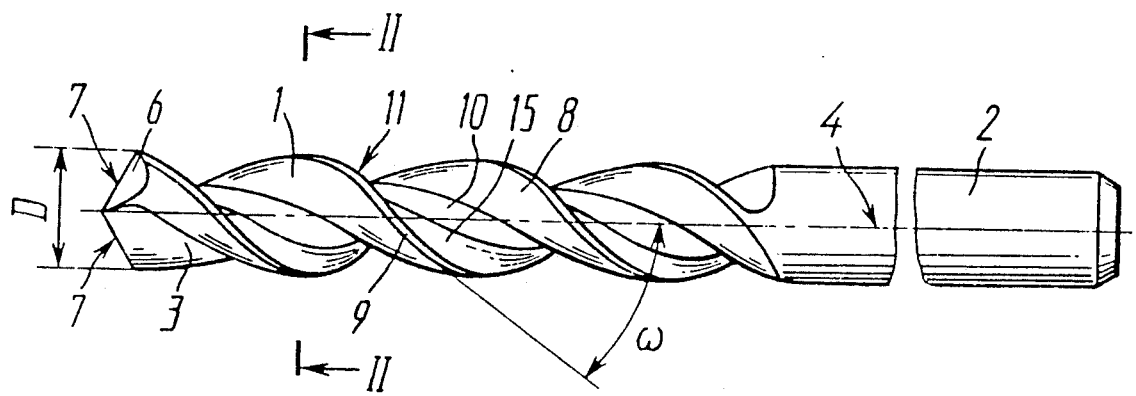
FIG. 1 is a general view of the spiral drill with the helical flutes according to the invention, side view with a cutout of the shank.

The disclosed drill comprises a point 1 (FIG. 1) and a shank 2. The point of the drill is provided with helical flutes 3 inclined to the drill axis 4 at an acute angle $\omega$ and intended for the disposal of chips. Each helical flute 3 has a leading surface 5 (section a—b in FIG. 2) forming, on intersection with the drill sharpening surface 6 (FIG. 1), a major cutting edge 7, a flank surface 8 (section c—d in FIG. 2) merging with a land 9 (FIG. 1), and a mating surface 10 (section b—c in FIG. 2) of leading 5 and flank 8 surfaces of helical flutes 3. Each mating surface 10 of the leading and flank surfaces of helical flutes 3 touches upon the drill core K.

Figure 2:
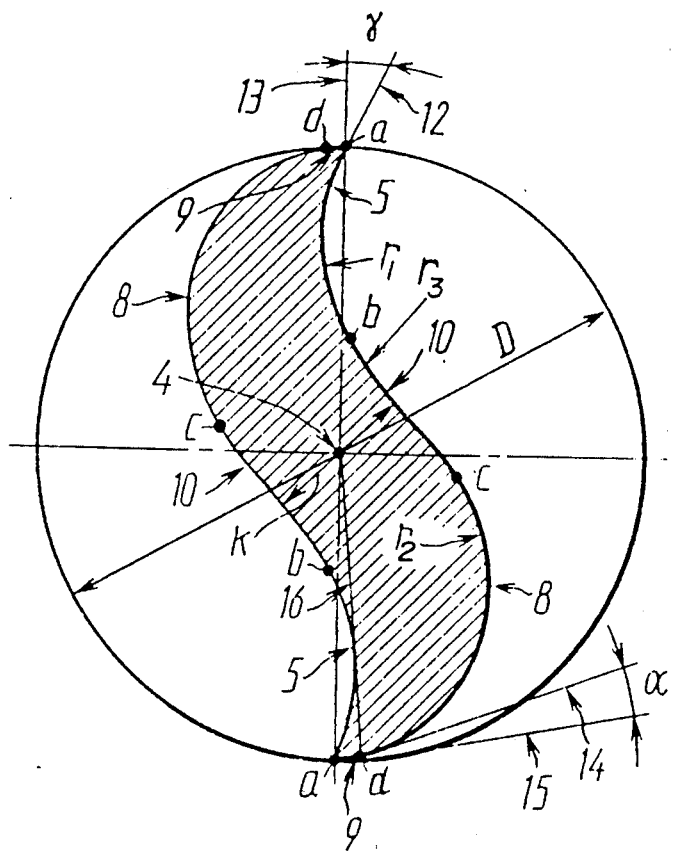
FIG. 2 is a section taken along the line II—II in FIG. 1, enlarged.

As shown in FIG. 2, the leading surface 5 of the helical flutes 3 intersected by a plane perpendicular to the drill axis 4 in section a—b follows the arc of a circle whose radius $r_1$ varies from 0.30 to 0.35 of the drill diameter D. If the radius $r_1$ is reduced below 0.3 D this results in spalling of the major cutting edge 7 near the point 'a' when the drill is made of a hard alloy or extra-hard materials, and in crushing of said edge 7 near the point 'a' when the drill is made of high-speed steels.

The radius $r_1$ over 0.35 D results in 'convexity' of the major cutting edge 7 which impairs the cutting conditions near the point 'a' of both the major cutting edge 7 and the minor cutting edge 11 (FIG. 1) of the land 9.

It is shown in FIG. 2 that the flank surface 8 of the helical flutes intersected by a plane perpendicular to the drill axis 4 on the section c—d follows the arc of a circle with the radius $r_2$ from 0.25 to 0.30 of the drill diameter D.

Reducing the radius $r_2$ below 0.25 D impairs removal of chips and complicates the drill manufacture due to a considerable curvature of the helical flutes 3 on the section c—d of the flank surface 8 and causes undercutting of the flank surface 8 near point c. Increasing the radius $r_2$ above 0.30 D reduces the drill strength due to a diminished volume of the tool body enclosed between the flank 8 and leading 5 surfaces of the adjacent helical flutes 3.

As can be seen in FIG. 2, the mating surface 10 of the leading 5 and flank 8 surfaces of the helical flute 3 intersected by a plane perpendicular to the drill axis 4 on the section b—c follows the arc of a circle with a radius $r_3$ varying from 1.0 to 1.5 drill diameters D. Making the radius $r_3$ smaller than 1.0 D results in probable clogging or sticking of chips in the helical flutes 3 because of a reduction of their volume. Making the radius $r_3$ larger than 1.5 D results in a certain reduction of drill strength due to diminishing of the volume of tool body enclosed between the surfaces 10 of the adjacent helical flutes 3.

As it is shown in FIG. 2, the mating surfaces 10 between the leading 5 and flank 8 surfaces of each helical flute 3 form a core K of the drill whose thickness varies from 0.2 to 0.3 of the drill diameter D. The thickness of the core K smaller than 0.20 D distorts the drill axis 4 and impairs the precision and standard of machining of holes due to diminished longitudinal stability and bending strength of the drill. The thickness of the drill core K above 0.3 D reduces the volume of helical chip flutes 3, impairs chip disposal and worsens the efficiency, standard of hole machining and durability of the drill.

The face angle $\gamma$ (FIG. 2) of the minor cutting edge 11 of the land 9, shown in the section of the drill with a plane perpendicular to the drill axis 4 is included between the tangent 12 to the arc of a circle with a radius $r_1$ in the point 'a' farthest from the drill axis 4 and the straight line 13 drawn through the drill axis 4 to the same point 'a'. The angle $\gamma$ varies from 25° to 30°. Reducing the angle $\gamma$ below 25° results in blunting of the minor cutting edge 11 of the land 9 and a lower quality of cutting. The quality of hole machining is impaired. Increasing the angle above 30° results in spalling of major cutting edges 7 and minor cutting edges 11 of the lands 9 near the point 'a' of the drill made of a hard alloy or extra-hard materials, and in crushing of the same edges 7 and 11 near the point 'a' of the drill made of high-speed steel.

The back angle $\alpha$ of the land 9 shown in FIG. 2 in the section of the drill by a plane perpendicular to the drill axis 4 is included between the tangent 14 to the arc of a circle with a radius $r_2$ in the point $\alpha$ farthest from the drill axis 4 and a perpendicular 15 to the straight line 16 drawn through the drill axis 4 to the same point $\alpha$. The angle $\alpha$ ranges from 8° to 12°.

The disclosed drill functions as follows.

When drilling a hole, the work is started by the major cutting edges 7 which remove the bulk of the material and form chips. The rational shape of the major cutting edges 7 is ensured by the above-stated value of radius $r_1$ of the leading surface 5 of helical flutes 3. Then comes the turn of the minor cutting edges 11 of the $\gamma$ lands 9 (FIG. 1) which cut the material by the face angle (FIG. 2) and shape finally the hole surface, ensuring its quality. The produced chip moves through helical flutes 3 formed by the sections of three mating circular helical surfaces 5, 8 and 10. Thanks to the smooth rounded shape of helical flutes 3 the chips are freely removed without sticking and clogging in the helical flutes 3, particularly when drilling printed circuit boards from foil-coated dielectrics (glass-base textolite, paper-based laminate, etc.).

Easy and fast removal of chips improves efficiency due to increased feed and speed of cutting. Simultaneously, the drilling temperature is also reduced thereby increasing the durability of the drill; also reduced is the pressure of chips on the hole walls which diminishes their damage and ensures a high quality of hole machining.

The guiding lands 9 of the drill contact the hole walls ensuring the rectilinearity of the drill axis 4 and the accuracy of hole machining. Owing to a considerable value of the face angle $\gamma$ the sharp edges 11 of the lands 9 near point 'a' easily undercut the material and ensure a high quality and low roughness of the hole walls. The selected value of the back angle $\alpha$ of the lands 9 ensures structural strength of the lands 9 in spite of their small width and eliminates friction of the flank surface 10 of the helical flutes 3 against the walls of the hole being machined.

A small width of the land 9 contributes to a smaller friction and heating in the course of hole drilling while absence of elevation of the lands 9 above the flank surfaces 10 of the helical flutes 3 improves the transfer of heat into the drill body. All these factors reduce the temperature of lands 9 and of the hole walls, increase durability of the drill and quality of the hole. This advantage manifests itself most conspicuously while drilling the printed circuit boards from glass-base textolite or paper-based laminate containing solidified epoxy resins with a low melting temperature.

The above stated thickness of the core K and the radiuses $r_1$ and $r_2$ of the flank surface 8 and of the surface 10 of the helical flutes shown in the section perpendicular to the drill axis 4 in FIG. 2 ensure the requisite strength during operation at high feeds and cutting speeds.

The employment of drills of the disclosed design solves to a certain degree the problem of improving the durability of drills, efficiency of drilling and quality of machining holes in printed circuit boards from foil-coated glass-base textolites and other low-strength materials ensuring efficient technology of drill manufacture including drills of hard alloys, polycrystalline and other extra hard materials.

INDUSTRIAL APPLICABILITY

The present invention can be used most successfully on special high-speed semiautomatic and automatic machines with numerical program for making holes in printed circuit boards; on universal drilling turning and jig-boring machines, transfer machines and in automatic machining lines for making holes in one-sided, two-sided and multi-layer printed circuit boards (including packs of boards) made of foil-coated glass-base textolite and paper-based laminate (e.g. holes of 0.2 to 3.0 mm diameter at a cutting speed up to 250 m/min and a feeding rate up to 150 mm/s on using drills made of hard alloys), when machining holes in flexible and heat conducting printed circuit boards based on the sheet material of ligth alloys and in the parts made from other low-strength materials, including plexiglas, plastics and other similar materials for making holes up to 15 diameters deep without withdrawing the drill from the hole in the process of drilling. The hole manufacturing precision attained by using the drills made of hard alloys reaches the 6th grade (H6).

Besides, the invention can be applied for machining precision holes including deep ones on the machines of the machining centre type, in frames and other parts made from light alloys and other low-strength materials.

We claim:

1. A spiral drill with helical chip flutes (3) inclined to the drill axis (4) at an acute angle (w) and having, each, a leading surface (5) forming, on intersection with the rear drill sharpening surface (6), a major cutting edge (7), a flank surface (8) merging with the guide land (9), and a mating surface (10) between the leading (15) and flank (8) surfaces contacting the drill core K characterized in that the leading (5) and flank (8) surfaces of the helical flutes (3) and their mating surface (10), in a section perpendicular to the drill axis, each has the form of an arc of a respective circle.

2. A drill according to claim 1 characterized in that the leading surface (5) of the helical flutes (3) in the section perpendicular to the drill axis (4) follows the arc of a circle with a radius ($r_1$) ranging from about 0.30 to about 0.35 drill diameter (D).

3. A drill according to claim 1 characterized in that the flank surface (8) of the helical flutes (3) in the section perpendicular to the drill axis (4) follows the arc of a circle with a radius ($r_2$) varying from about 0.25 to about 0.30 of the drill diameter (D).

4. A drill according to claim 3 characterized in that the tangent (14) to the arc of a circle with a radius ($r_2$) in the point (d) farthest from the drill axis (4) forms an angle ($\alpha$) varying from about 8° to about 12° with the perpendicular (15) to the straight line (16) drawn through the drill axis (4) to the same point (d).

5. A drill according to claim 1 characterized in that the mating surface (10) between the leading (5) and flank (8) surfaces of helical flutes (3) in the section perpendicular to the drill axis (4) follows the arc of a circle with a radius ($r_3$) varying from about 1.0 to about 1.5 of the drill diameter (D).

6. A drill according to claim 1 characterized in that the mating surfaces (10) between the leading (5) and flank (8) surfaces of helical flutes (3) form the dimension of the drill core (K) between these surfaces, said dimension varying from about 0.2 to about 0.3 of the drill diameter (D).

* * * * *